United States Patent [19]

Kamada et al.

[11] 4,101,683

[45] Jul. 18, 1978

[54] PROCESS FOR MANUFACTURE OF FAST COOKING RICE

[75] Inventors: Hidemoto Kamada, Tokyo; Chiaki Miura, Kawasaki; Makoto Utena, Niiza, all of Japan

[73] Assignee: Calpis Shokuhin Kogyo Kabushiki Kaisha, Tokyo, Japan

[21] Appl. No.: 704,578

[22] Filed: Jul. 12, 1976

[30] Foreign Application Priority Data

Jul. 16, 1975 [JP] Japan .................................. 50/86156

[51] Int. Cl.$^2$ ............................................. A23L 1/182
[52] U.S. Cl. ..................................... 426/618; 426/625
[58] Field of Search ................ 426/445, 447, 618, 625

[56] References Cited

U.S. PATENT DOCUMENTS

| | | | |
|---|---|---|---|
| 2,278,463 | 4/1942 | Musher | 426/447 X |
| 2,278,470 | 4/1942 | Musher | 426/447 X |

*Primary Examiner*—Joseph M. Golian
*Attorney, Agent, or Firm*—Stevens, Davis, Miller & Mosher

[57] ABSTRACT

Fast cooking rice which readily reconstitutes itself into cooked rice is manufactured by a process which comprises causing a specified thickener to be diffused from the surface to the inside center of rice grains puffed in advance to a high degree and subsequently subjecting the treated puffed rice grains to drying and shrinking treatments.

4 Claims, No Drawings

PROCESS FOR MANUFACTURE OF FAST COOKING RICE

BACKGROUND OF THE INVENTION

Cooked rice which is a staple food in the countries of East Asia is so-called "steamed and boiled rice". It is cooked by a time-consuming procedure which comprises the steps of first washing raw rice (which means hulled rice in the instant specification and claims) with water, allowing the washed rice to absorb water amply and thereafter steaming and boiling the water-impregnated rice for a long time. Ample impregnation with water and an appropriate extent of boiling and steaming are required for preparing the cooked rice of soft texture and agreeable teeth-resistance. Then requirement for rigid control of these conditions prevents a quick cooking. The fact that this cooking consumes much time also constitutes one disadvantage.

Another typical example of cooked rice is pilaf. This is prepared by frying washed rice with oil, whereafter the fried rice is steamed and boiled in the presence of added water. It has the disadvantage that the texture is generally hard. This disadvantage can be overcome by continuing the treatment of steaming and boiling for a relatively long time. Nevertheless, it still has a drawback in that the cooking consumes much time. In view of the above, there is, a need for development of fast cooking rice which readily provides cooked rice of the class described above.

What is called "gelatinized rice" has heretofore been regarded as a kind of fast cooking rice. This is usually prepared by subjecting the rice to the ordinary treatment of steaming and boiling for thereby gelatinizing the rice starch and thereafter drying the starch-gelatinized rice. By mere addition of hot water at a temperature of about 80° C or over, however, the fast cooking rice prepared as described above fails to reconstitute itself into cooked rice possessed of desired texture. It is not converted into desirable cooked rice unless it is boiled for several minutes by heating. Such time-consuming treatment does not befit the fast cooking rice for which the instantaneousness counts strongly.

A method which produces cooked rice by mere addition of hot water has been disclosed by Japanese Patent Publication No. 5729/1959. The method disclosed therein comprises first steaming and boiling the raw rice to a extent mild enough to pregelatinize the surface layer of the rice grains, then causing the steamed and boiled rice to absorb a paste such as dextrin or sodium carboxymethyl cellulose, subjecting the treated rice to a treatment for regular steaming and boiling for thereby completely gelatinizing the rice grains to the inside center and finally drying the gelatinized rice. The fast cooking rice which is obtained by this method has the disadvantage that, when hot water is added thereto immediately before its consumption, the required reconstitution takes much time or the reconstituted rice has a rather hard texture, possibly because the rice, in the final treatment of drying, suffers partial retrogradation of the rice starch which has once been gelatinized. Furthermore, the process of manufacture is complicated.

Studies have also been continued with a view to producing fast cooking rice which can be reconstituted into as exact an equivalent of regular boiled and steamed rice as practicable. For example, there is a method which utilizes puffed rice, with due consideration of the fact that gelatinized rice is obtained by puffing rice grains. If simply puffed rice is used as a fast cooking rice, it is quickly softened in the presence of hot water added thereto prior to its consumption. Nevertheless, it has the disadvantage that the hot water deprives the rice grains of their shape and renders them quite different from regular boiled and steamed rice in taste, texture, viscoelasticity, etc. Japanese Patent Publication No. 27700/1971 discloses a method which comprises the steps of first puffing raw rice to a slight extent, then immersing the puffed rice in water for thereby heightening the water content thereof, subsequently gelatinizing the puffed rice of increased water content, thereafter drying the gelatinized rice until the water content thereof decreases to a prescribed level and finally re-puffing the dried rice. The fast cooking rice produced by this method, however, suffers from an undesirable spongy texture and poor teeth-resistance. It has the further disadvantages that the process for manufacture is complicated and the yield is consequently low.

As described above, there have been conceived methods for the manufacture of fast cooking rice which combine the treatment of puffing with other treatments. These conventional methods, however, are complicated from the operational point of view because the water content of rice grains must be rigidly regulated in the course of treatments and consequently because the rigid regulation of water content calls for additional treatments, and so on. Methods which involve use of oil and fat are not desirable because the oil and fat incorporated into the rice grains degrade the taste and induce oxidation of said oil and fat to the extent of heavily impairing the quality of fast cooking rice. Also, the removal of excess oil and fat in the course of manufacture demands much time and labor.

SUMMARY OF THE INVENTION

The primary object of the present invention is to provide a process for the manufacture of fast cooking rice easily and providing cooked rice which, when served for meals, retains the shape of rice grains unimpaired, and permits the rice grains to remain in their inherent shape and also excels in texture, taste, flavor, etc.

Another object of this invention is to provide a fast cooking rice which is so easily reconstituted that it can be ready for a meal after several minutes of standing in hot water of a temperature of not less than about 80° C.

Still another object of the present invention is to provide a fast cooking rice which is so easily reconstituted that it affords pilaf of a desirable texture after several minutes of cooking such as in a frying pan in the presence of a small amount of water and, by preference, of some oil added thereto.

Yet another object of this invention is to provide a fast cooking rice capable of a wide range of applications such that it readily produces curry-flavored fried rice and many other kinds of cooked rice when cooked in combination with seasoning agents, dry vegetables, dry meat and other foodstuffs.

It is also an object of this invention to provide a simple process for the manufacture of fast cooking rice without entailing complicated steps of treatment from the operational point of view.

DETAILED DESCRIPTION OF THE INVENTION

A study continued with a view to materializing the objects of this invention has led to the discovery that a fast cooking rice of excellent quality can be obtained by a simple process by using specific additives. This invention has been accomplished on the basis of this discovery.

In brief this invention comprises the steps of preparing a rice puffed to a high degree and adding to the puffed rice the additives to be described herein below and a step of drying and shrinking the treated puffed rice grains. Thus, this invention is characterized by the combination of the rice puffed in advance to the extent of acquiring an enhanced-porous texture and having incorporated the specific additives. The invention will be described in further detail below.

The first step is to prepare rice puffed to a high degree. The rice grains to be used in making the puffed rice may be of any of the numerous species available. For the purpose of this invention, the puffed rice grains obtained by any methods other than the method resorting to the treatment in heated oil and fat can be used. For example, the puffed rice obtained by first treating rice grains in a closed container kept at elevated temperatures under increased pressure and releasing the rice grains into the atmosphere for thereby allowing them to puff, those puffed by means of heated air, those puffed by having rice grains heated with high-frequency waves and those puffed by having rice grains roasted in conjunction with heated grains such as of common salt, fine sand, ceramic, or those puffed by some other similar puffing method are all usable for this invention. The degree of puffing is desired to be from 6 to 16 times, preferably from 9 to 12 times, as large in volume (hereinafter the degrees of puffing will be expressed in terms of "volume") as the raw rice grains. The degree of puffing of the figures (6 to 16) as used in the instant specification and claims illustrates an average of each rice grain because the size and quality of each rice grain is different. For example, "6 times" includes the degree of puffing of a little bit smaller and also larger than 6 times.

Then the second step is to add a thickener to the puffed rice grains. The term "thickener" as used in the instant specification and also in the claims refers to polysaccharides of plant origin, their derivatives, polysaccharides produced by the use of microorganisms and some of the polymerized substances produced by artificial production including derivation and synthesis. The thickener to be used for the present invention will be concretely described herein below.

There are polysaccharides derived from marine plants: Agar, carrageenin, alginate, alginic acid and furcellaran belong to this class.

There are gums originating in plant seeds of the ground: Locust bean gum, guar gum, tamarind gum, psyllium seed gum, quince seed gum and gaz belong to this class.

There is karaya gum obtained from plant exudate. There is pectin which is derived from fruits. Besides, glucomannan which is contained in Amorphophallus Konjac in a large amount is also usable.

There are artificially produced thickeners: Propylene glycol alginate, low methyl ester pectin, sodium polyacrylate and cellulose derivatives such as carboxylmethylcellulose salt, methylcellulose, hydroxymethylcellulose, methylethylcellulose and hydroxypropylcellulose belong to this class.

There are microorganically produced thickeners: Xanthan gum, cardrun, scleroglucan, succinoglucan and pullulan belong to this class.

The present invention requires the use of at least one of the thickeners enumerated above.

To be more specific, by using a specific thickener selected from the thickeners enumerated above, there can be manufactured a fast cooking rice which produces cooked rice of more excellent texture after several minutes of standing with added hot water of a temperature of not less than about 80° C. The fast cooking rice obtained with such a thickener, of course, is suitable for preparation of pilaf and other cooked rice.

The specifically selected thickeners consists of agar, carrageenin, propylene glycol alginate, carboxymethylcellulose salt, methylcellulose and glucomannan.

Now, the method by which the thickener is added to the puffed rice will be described. This addition is accomplished by causing the thickener to penetrate into the puffed rice. As a concrete method, it is desirable to employ one which uses the thickener in the form of an aqueous solution. For example, the addition is effectively carried out by immersing the puffed rice in an aqueous solution containing the thickener or by spraying or sprinkling said aqueous solution on the puffed rice. The advantage of this method is the fact that the individual rice grains can be uniformly treated throughout from the surface to the inside center. In contrast, the method of addition which uses the powdered thickener in its unaltered form fails to attain the object of this invention, because the thickener cannot uniformly penetrate into the interior texture of the rice grains.

Various conditions of treatment such as concentration of the aqueous solution of thickener and temperature will be described. It is natural that the conditions are variable to some extent because the thickeners themselves have properties different from one another. It is generally desirable, however, to avoid heightening the viscosity of the aqueous solution of thickener more than is required. If the viscosity of the aqueous solution is high, there is a danger that the treatment aimed at is obtained only on the surface of the puffed rice and not sufficiently inside the rice grains. Furthermore, the individual rice grains tend to conglomerate into lumps. The increase in viscosity further renders the handling of the aqueous solution itself difficult proportionally. Moreover, after the treatment by the addition of thickener, the required removal of the excess aqueous solution adhering to the puffed rice cannot be fulfilled satisfactorily. The high viscosity also raises a difficulty in immersing the puffed rice having a low specific gravity in the aqueous solution. The ranges of concentration suitable for the use of aqueous solutions of these thickeners are substantially similar and the other treatments such as for addition of thickeners can be carried out under similar conditions. The description, therefore, will be given generally to cover all the thickeners.

The concentration of the thickener in the aqueous solution should fall in the range of from 0.1 w/w percent to 1.0 w/w percent (hereinafter indicated invariably in percent by weight/weight), preferably in the neighborhood of 0.5 percent. The range of concentration, however, is variable slightly from one thickener to another. When the concentration fails to reach the lower limit 0.1 percent, the effect aimed at cannot be obtained satisfactorily. When it exceeds the upper limit 1.0 percent, however, the viscosity of the aqueous solution becomes so high that the solution cannot be handled easily, the individual rice grains tend to adhere mutually to form lumps and the final product has no desirable flavor.

The temperature of the aqueous solution is only required to be such as to permit thorough solution of the thickener. In the case of the aqueous solution of agar, for example, a temperature higher than 40° C is enough. In the immersion of the puffed rice in the aqueous solution of a thickener, the duration of immersion can be decreased in proportion as the temperature of the solution is increased. In the use of 0.4% aqueous solution of agar, for example, the immersion given for ten seconds at 65° or for one minute at 40° C will suffice for the purpose. Where the addition is effected by spraying or sprinkling, the treated rice, as a matter of course, should be left to stand at rest for a while to ensure uniform and thorough penetration of the aqueous solution into the individual grains of puffed rice. No matter whether the addition is effected by immersion, spraying or sprinkling, the purpose of the treatment is attained insofar as the aqueous solution thoroughly penetrates to the inside center of the puffed rice which has a porous texture.

The final third step is to dry, by an ordinary method, the puffed rice with which the thickener has been incorporated as described above. The drying may be carried out under normal atmospheric pressure or under vacuum, either in the absence or in the presence of heating. During the drying, the individual grains of the puffed rice may be kept stationary or may be moved. The method of drying, therefore, can suitably be selected by taking into due consideration the amount of puffed rice, the desired duration of drying time (reflecting readiness of handling), the desired quality of the fast cooking rice to be produced, etc. Where the drying is effected by application of heat, due attention should be paid to avoiding excessive heating which frequently results in the occurrence of burnt rice emitting an objectionable odor. Concrete examples of the drier well known for this purpose include a tunnel and band dryer, a chamber dryer, an infrared dryer, etc.

In consequence of the gradual vaporization of water, the puffed rice diminishes in volume eventually to approach the volume of raw rice while the incorporated thickener is retained throughout from the surface to the inside center of individual rice grains. To obtain a fast cooking rice which gives a desirable texture when served for a meal and yet is not so bulky as to impair the ease of handling, the process of drying is desirably terminated at the time by which the volume of the treated puffed rice has decreased to less than three times the volume of raw rice.

To the aqueous solution of thickener, to the puffed rice which has incorporated a thickener, or to the fast cooking rice which has undergone the treatment of drying, various seasoning agents, nutrition enriching agents, color-improving agents, etc. may be suitably added and blended therewith. As a result, there can be easily produced a flavored fast cooking rice.

As described in detail up to this point, this invention comprises the first step of puffing rice grains to a high degree for thereby gelatinizing rice starch, inducing cleavage of rice starch micelle, forming a porous texture in the rice grains and causing a specific thickener to be amply entrapped within the rice grains and the subsequent step of drying the treated puffed rice to the extent of allowing the rice grains to dwindle to a prescribed volume. The fast cooking rice which is manufactured as described above provides high yields of production and high preservability and, upon reconstitution, converts itself into a cooked rice excelling in taste, texture and flavor.

Reconstitution of this fast cooking rice, for example, into ordinarily cooked rice can be obtained by adopting a method which is generally practiced in preparing fast cooking rices of this kind. To be specific, the desired reconstitution into cooked rice can be accomplished by allowing this fast cooking rice to stand for one to two minutes in hot water heated in advance to about 80° C or over and added in a volume roughly 1 to 1.5 times the volume of rice, then discarding an excess portion of said hot water and thereafter allowing the rice to be steamed for three to four minutes with the remaining heat. The fast cooking rice can be reconstituted into a soup containing rice grains by following the same procedure except for removal of excess hot water. The fast cooking rice produced by this invention can be also amply reconstituted into a cooked rice of good quality when it is left to stand in water of normal room temperature for about 30 minutes. When the fast cooking rice is reconstituted with milk instead of water of normal room temperature, the resultant cooked rice tastes good. For a user who feels like eating pilaf, a pilaf of mild texture can be obtained by heating the fast cooking rice of this invention such as in a frying pan in the presence of a small amount of oil and fat and a suitable amount of water.

Obviously modifications and variations are possible insofar as they do not depart from the spirit and scope of the present invention. This invention is not limited to the specific embodiments thereof except as defined in the appended claims.

EXAMPLE 1

A raw rice was expanded by a puffing gun into a puffed rice having a volume of 9 times the original. Two(2.0) Kg of this puffed rice was immersed for 10 - 15 seconds in a 0.4% aqueous solution of agar-agar kept at 65° C. It was immediately placed in an electric constant-temperature hot-air dryer at 90° C and dried therein for 2.5 hours to produce 1.9 kg of fast cooking rice having a volume of about twice as large as that of the raw rice. This fast cooking rice was placed in a container provided with a lid. The same volume of hot water at 95° C was poured into the container. The rice and the hot water in the container were left to stand for 90 seconds. Then, the excess hot water was discarded. Thereafter, the fast cooking rice was left to be steamed for 3 minutes with the remaining heat. Consequently, there was obtained a cooked rice excellent in taste, texture and flavor.

EXAMPLE 2

A raw rice was expanded by a puffing gun into a puffed rice having a volume of 16 times as large. Two(2.0) Kg of this puffed rice was sprayed with 5.3 kg of 0.3% aqueous solution of sodium carboxymethylcellulose at normal room temperature, then left to stand at normal room temperature for 10 minutes, thereafter placed in a drying oven at 70° C and dried therein for 4 hours to afford 2.0 Kg of fast cooking rice having a volume about twice as large as the volume of raw rice.

A cooked rice of excellent quality was obtained by subjecting the fast cooking rice to treatment by the same procedure as in Example 1.

EXAMPLE 3

A raw rice was expanded by a puffing gun into a puffed rice having a volume of 9 times as large. One(1.0) Kg of this puffed rice was sprayed with 2.5 Kg of 1.0% aqueous solution of lambda carrageenin at 44° C, then left to stand for ten minutes at normal room temperature, subsequently placed in a vacuum dryer, dried first at 65° C under normal atmospheric pressure for one hour to vaporize the water and then at 65° C under a vacuum of less than 10 mmHg for 3.5 hours. Thus, there was obtained 0.98 Kg of a fast cooking rice having a volume of about 1.7 times the volume of the raw rice. A cooked rice of excellent quality could be obtained by treating this fast cooking rice by the same procedure as in Example 1.

EXAMPLE 4

A raw rice was expanded by use of heated air at 300° C into a puffed rice having a volume of 6 times as large. Three(3.0) Kg of this puffed rice was immersed in 0.45% aqueous solution of guar gum kept at 65° C, then immediately placed in a drying oven at 90° C and dried for three hours to afford 2.9 Kg of a fast cooking rice having a volume of about 1.7 times as large as that of the raw rice. Two hundred (200) g of this fast cooking rice was placed in a frying pan and heated in the presence of 600 g of water, and a small amount of salad oil was added thereto. There was consequently obtained a cooked rice excellent in taste, texture and flavor.

EXAMPLE 5

A raw rice was expanded by a puffing gun into a puffed rice having a volume of 10 times as large. One and a half (1.5) Kg of this puffed rice was immersed in a seasoning aqueous solution containing 0.5% of propylene glycol alginate, 0.5% of sodium chloride and a small proportion of seasoning agent. After about 15 seconds of immersion in the solution, the puffed rice was immediately placed in a drying oven at 85° C and dried therein for three hours to afford 1.4 Kg of a fast cooking rice having a volume of about 1.9 times as large as that of the raw rice. A curry-flavored cooked rice was obtained by cooking this fast cooking rice in the presence of curry powder and raisin added thereto by a procedure similar to that of Example 4.

What is claimed is:

1. A process for the manufacture of fast cooking rice, consisting essentially of puffing a raw rice into a puffed rice having a volume of 6 to 16 times as large, contacting this puffed rice with a solution of a thickener in a concentration in the range from about 0.1 to about 1.0 weight percent sufficiently to penetrate to the inside center of the puffed rice, and thereafter drying the treated puffed rice to reduce the volume thereof, said thickener being selected from the group consisting of agar, carrageenin, alginate, alginic acid, locust bean gum, guar gum, tamarind gum, psyllium seed gum, quince seed gum, gaz, pectin, glucomannan, propylene glycol alginate, low methyl ester pectin, sodium polyacrylate, carboxymethylcellulose salt, methylcellulose, hydroxymethylcellulose, methylethylcellulose, hydroxypropylcellulose, xanthan gum, cardrun, scleroglucan, succinoglucan and pullulan.

2. A fast cooked rice produced according to the process to claim 1.

3. A process for the manufacture of fast cooking rice, consisting essentially of puffing a raw rice into a puffed rice having a volume of 6 to 16 times as large, contacting this puffed rice with a solution of a thickener in a concentration in the range from about 0.1 to about 1.0 weight percent sufficiently to penetrate to the inside center of the puffed rice, and thereafter drying the treated puffed rice to reduce the volume thereof, said thickener being selected from the group consisting of agar, carrageenin, propylene glycol alginate, glucomannan, methylcellulose and carboxymethylcellulose salt.

4. A fast cooked rice produced according to the process of claim 3.

* * * * *